United States Patent
Emori

(10) Patent No.: US 9,211,683 B2
(45) Date of Patent: Dec. 15, 2015

(54) METHOD FOR MANUFACTURING GAS TANK

(75) Inventor: Sakuma Emori, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 71 days.

(21) Appl. No.: 14/119,577

(22) PCT Filed: May 23, 2011

(86) PCT No.: PCT/JP2011/061777
§ 371 (c)(1),
(2), (4) Date: Nov. 22, 2013

(87) PCT Pub. No.: WO2012/160640
PCT Pub. Date: Nov. 29, 2012

(65) Prior Publication Data
US 2014/0096895 A1    Apr. 10, 2014

(51) Int. Cl.
*B29D 22/00* (2006.01)
*F17C 1/06* (2006.01)
*F17C 1/02* (2006.01)

(52) U.S. Cl.
CPC .............. *B29D 22/003* (2013.01); *F17C 1/02* (2013.01); *F17C 2201/0109* (2013.01); *F17C 2201/056* (2013.01); *F17C 2201/058* (2013.01); *F17C 2203/0604* (2013.01); *F17C 2203/067* (2013.01); *F17C 2203/0619* (2013.01); *F17C 2203/0665* (2013.01); *F17C 2205/0305* (2013.01); *F17C 2209/2154* (2013.01); *F17C 2221/012* (2013.01); *F17C 2223/0123* (2013.01); *F17C 2223/036* (2013.01); *F17C 2270/0105* (2013.01); *F17C 2270/0178* (2013.01); *F17C 2270/0184* (2013.01); *F17C 2270/0189* (2013.01)

(58) Field of Classification Search
CPC .... B29D 22/00; F17C 2209/2154; F17C 1/06
USPC .................................. 156/169, 173, 175, 172
See application file for complete search history.

(56) References Cited

U.S. PATENT DOCUMENTS

| 5,356,589 A | * | 10/1994 | Sugalski ........................ 264/265 |
| 2010/0025411 A1 | * | 2/2010 | Otsubo et al. .................. 220/581 |
| 2010/0075200 A1 | | 3/2010 | Hatta |

FOREIGN PATENT DOCUMENTS

| CN | 101548128 A | 9/2009 |
| JP | H05-329944 A | 12/1993 |
| JP | H06-335973 A | 12/1994 |
| JP | 7-310895 A * | 11/1995 |
| JP | 3527737 B1 | 2/2004 |
| JP | 2010-071444 A | 4/2010 |

OTHER PUBLICATIONS

Machine translation 07-310895, 4 pages, date unknown.*

* cited by examiner

*Primary Examiner* — Jeff Aftergut
(74) *Attorney, Agent, or Firm* — Kenyon & Kenyon LLP

(57) ABSTRACT

The present invention is a method of manufacturing a gas tank, this method including: a step of forming a fiber reinforced plastics layer by winding a fiber that is impregnated with thermosetting plastics around at least part of a mouthpiece and around a liner; and a step of thermally curing the fiber reinforced plastics layer through induction heating, wherein the mouthpiece is heated by a heating unit that is distinct from the induction heating while the fiber reinforced plastics layer is thermally cured.

4 Claims, 5 Drawing Sheets

METHOD FOR MANUFACTURING GAS TANK

CROSS REFERENCE TO RELATED APPLICATION

This is a national phase application based on the PCT International Patent Application No. PCT/JP2011/061777 filed on May 23, 2011, the entire contents of which are incorporated herein by reference.

BACKGROUND

The present invention relates to a method of manufacturing a gas tank.

For example, in a fuel cell system to be installed in a vehicle such as an automobile, a high-pressure gas tank is used as a supply source of fuel gas.

In a manufacturing process of this type of gas tank, a fiber that is impregnated with thermosetting plastics is wound around a substantially ellipsoidal liner (inner container) and around part of mouthpieces provided at respective two ends of the liner to form a fiber reinforced plastics (FRP (Fiber Reinforced Plastics)) layer, and the fiber reinforced plastics layer is then thermally cured. As a method of carrying out this thermal curing, heating the fiber reinforced plastics layer through induction heating has been proposed (see Patent Document 1).

Patent Document 1: Patent Publication JP-A-06-335973

However, if induction heating mentioned above is used, the mouthpiece portions are not heated by induction depending on the material of the mouthpieces. Therefore, a difference in temperature between the mouthpieces and portions of the fiber reinforced plastics layer that are in contact with the respective mouthpieces becomes excessively large during thermal curing. Thus, a large amount of heat in those portions of the fiber reinforced plastics layer is conducted to the mouthpieces, and the heating efficiency of the fiber reinforced plastics layer decreases. Furthermore, the portions of the fiber reinforced plastics layer that are in contact with the respective mouthpieces become less likely to be heated, and thus the entire fiber reinforced plastics layer may not be cured uniformly, which may generate unevenness in the strength of the gas tank.

SUMMARY

With the foregoing in view, it is an object of the present invention to provide a method of manufacturing a gas tank which allows a fiber reinforced plastics layer to be heated uniformly and efficiently.

The present invention for achieving the above object is a method of manufacturing a gas tank, and the method includes a step of forming a fiber reinforced plastics layer by winding a fiber that is impregnated with thermosetting plastics around at least part of a mouthpiece and around a liner and a step of thermally curing the fiber reinforced plastics layer through induction heating. While the fiber reinforced plastics layer is thermally cured, the mouthpiece is heated by a heating unit that is distinct from the stated induction heating.

According to the present invention, since the mouthpiece is heated by the heating unit that is distinct from induction heating while the fiber reinforced plastics layer is thermally cured through induction heating, heat loss from the fiber reinforced plastics layer to the mouthpiece can be suppressed. Accordingly, the fiber reinforced plastics layer can be heated efficiently. Furthermore, since a portion of the fiber reinforced plastics layer that is in contact with the mouthpiece can be heated similarly to other portions, the fiber reinforced plastics layer can be heated uniformly and be cured.

In the stated method of manufacturing the gas tank, a layer that is formed of a material having a dielectric constant larger than that of the mouthpiece may be provided between the mouthpiece and the fiber reinforced plastics layer. In such a case, since the layer provided between the mouthpiece and the fiber reinforced plastics layer is heated through induction heating, heat loss from the fiber reinforced plastics layer to the mouthpiece is suppressed. In addition, heat can be actively supplied to the fiber reinforced plastics layer, which makes it possible to heat the fiber reinforced plastics layer more efficiently.

In the stated method of manufacturing the gas tank, a heat insulating layer may be provided between the mouthpiece and the fiber reinforced plastics layer. In such a case, since heat loss from the fiber reinforced plastics layer to the mouthpiece can be suppressed, the fiber reinforced plastics layer can be heated uniformly and efficiently.

The mouthpiece may be made of aluminum, and the liner may be made of resin.

According to the present invention, the fiber reinforced plastics layer can be heated uniformly, and thus the strength of the gas tank can be made uniform. Furthermore, the fiber reinforced plastics layer can be heated efficiently, and thus the gas tank can be manufactured more efficiently.

DETAILED DESCRIPTION

Figure 1:
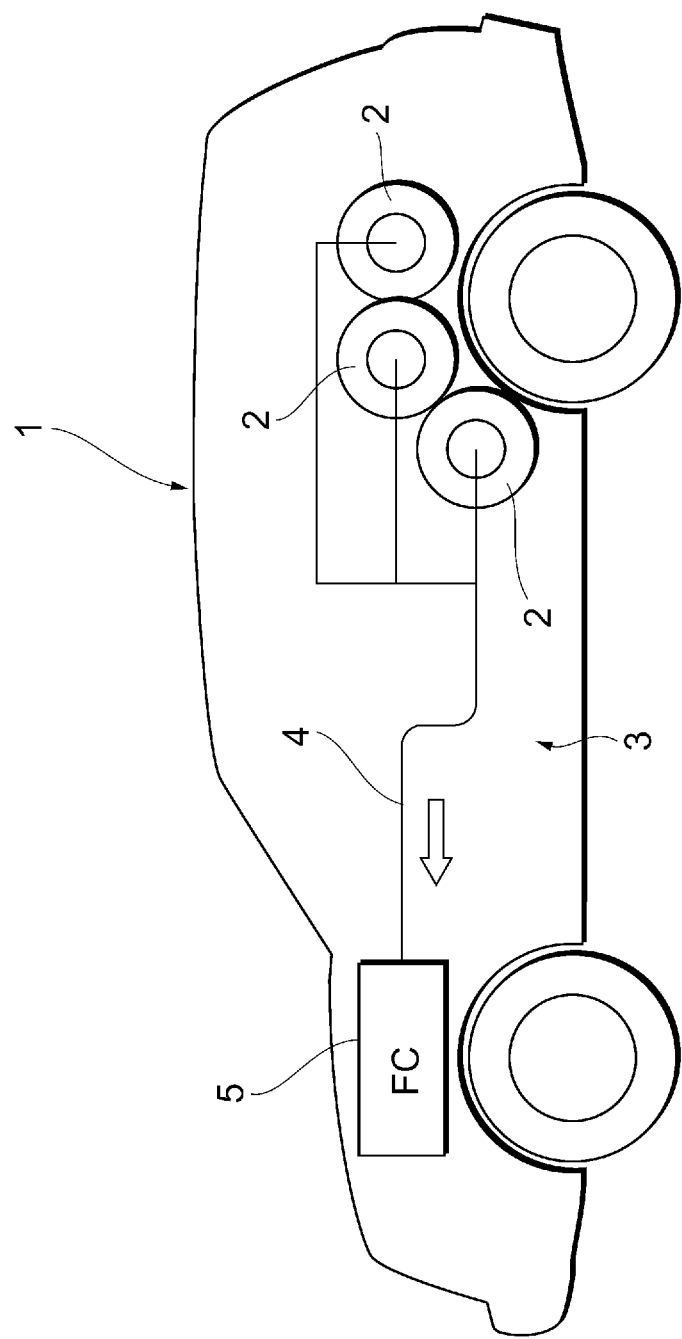
FIG. 1 is a schematic diagram of a fuel cell vehicle equipped with gas tanks.

Hereinafter, with reference to the drawings, a preferred embodiment of the present invention will be described. FIG. 1 is a schematic diagram of a fuel cell vehicle 1 that is equipped with gas tanks.

The fuel cell vehicle 1 includes, for example, three gas tanks 2 that are installed in a rear portion of the vehicle body. The gas tanks 2 partially constitute a fuel cell system 3, and fuel gas can be supplied to a fuel cell 5 from each gas tank 2 through a gas supply line 4. Fuel gas to be stored in the gas tanks 2 is a high-pressure flammable gas and, for example, is a hydrogen gas. Note that the gas tank 2 of the present embodiment can be applied not only to the fuel cell vehicle 1 but also to a vehicle such as an electric vehicle and a hybrid vehicle as well as various movable bodies (e.g., ships, airplanes, robots, etc.) and stationary facilities (houses, buildings).

Figure 2:
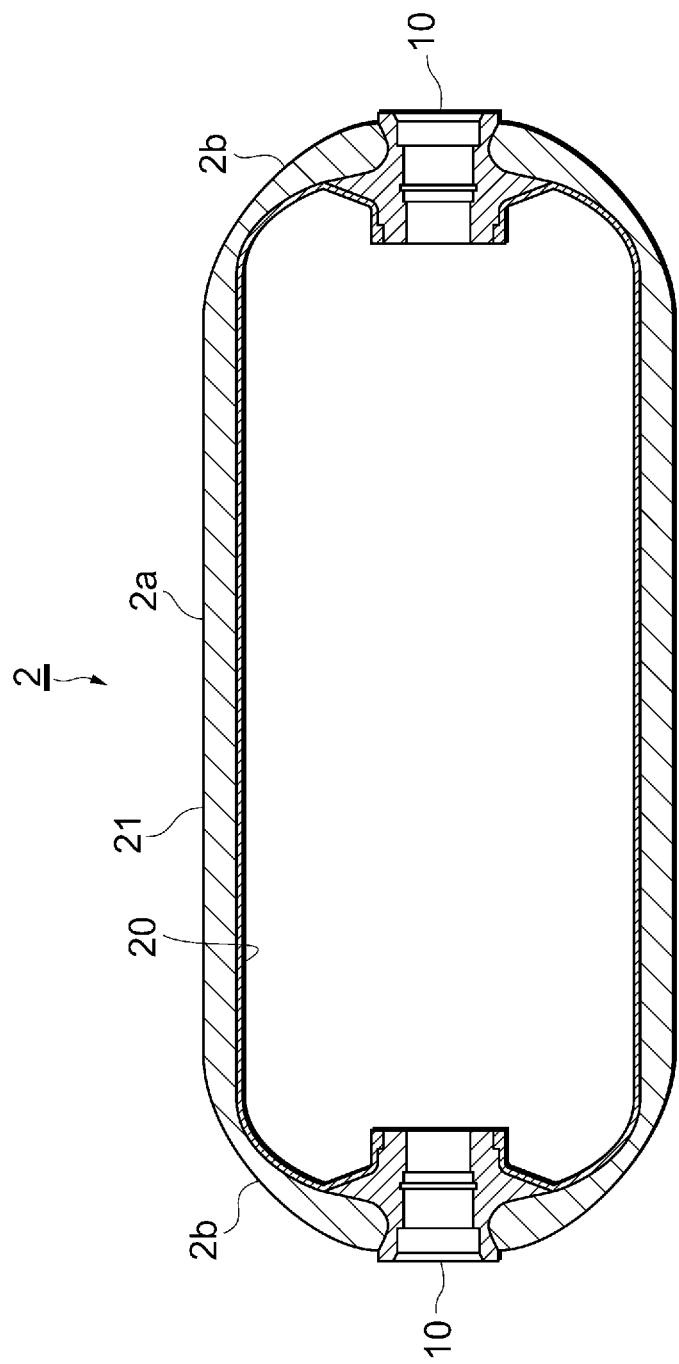
FIG. 2 is a longitudinal sectional view illustrating a schematic configuration of the gas tank.

FIG. 2 is a longitudinal sectional view illustrating a schematic configuration of the gas tank 2. The gas tank 2 includes a cylindrical barrel portion 2a that is formed, for example, in a substantially ellipsoidal shape and has a uniform diameter and substantially hemispherical dome portions 2b that are connected to respective two ends of the barrel portion 2a and that each has diameters that progressively decrease as the distance from the barrel portion 2a increases. Mouthpieces 10 are provided in the gas tank 2 at respective two ends in an axial direction of the tank. The mouthpieces 10 are made, for example, of aluminum.

The gas tank 2 includes a substantially ellipsoidal liner 20 provided thereinside. The liner 20 is made, for example, of resin and is formed of polyamide-based resin such as nylon 6 and nylon 6,6, polyethylene-based resin, or the like. Note that although the liner 20 of the present embodiment is made of resin, the liner 20 may be made of aluminum instead. The mouthpieces 10 are fitted in openings at the respective two ends of the liner 20. A fiber reinforced plastics layer 21 is formed so as to cover part of the surface of each mouthpiece 10 and substantially the entire surface of the liner 20.

The fiber reinforced plastics layer 21 is formed, for example, through a filament winding (FW) method, in which a fiber that is impregnated with thermosetting plastics is wound around outer peripheral faces of the mouthpieces 10 and of the liner 20. The fiber reinforced plastics layer 21 is constituted by a plurality of layers each wound in a distinct direction such as hoop winding and helical winding. Note that epoxy resin, modified epoxy resin, or unsaturated polyester resin, for example, is used as the resin for the fiber reinforced plastics layer 21. Furthermore, a carbon fiber, for example, is used as the fiber.

Subsequently, a method of manufacturing the gas tank 2 will be described. First, a fiber that is impregnated with thermosetting plastics is wound around part of each mouthpiece 10 and around the liner 20 through the FW method, and the fiber reinforced plastics layer 21 is formed on the outer peripheral faces of the mouthpieces 10 and of the liner 20. At this time, hoop winding, in which the fiber is wound in a direction perpendicular to the tank's axis, is carried out without exception.

Figure 3:
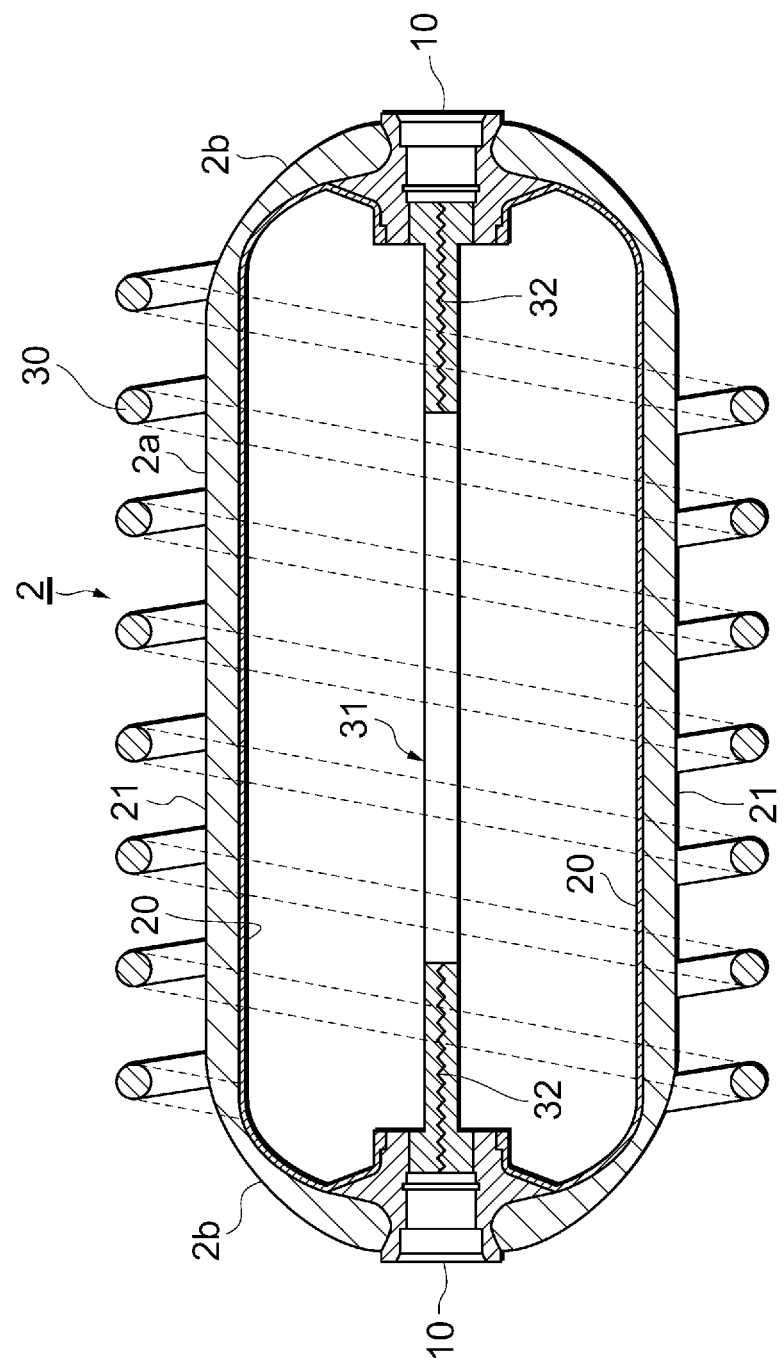
FIG. 3 is a longitudinal sectional view illustrating a state of the gas tank during induction heating.

Then, the fiber reinforced plastics layer 21 is thermally cured through induction heating. At this time, as illustrated in FIG. 3, an induction heating coil 30 is disposed around the liner 20. Furthermore, a heating shaft 31 serving as a heating unit is attached inside the liner 20 so as to be connected at both ends to the respective mouthpieces 10. A heater 32 such as a heating wire is embedded in this heating shaft 31, and as electricity is supplied to the heater 32, the heating shaft 31 produces heat. Note that the heating shaft 31 may be attached before the fiber reinforced plastics layer 21 is formed or after the fiber reinforced plastics layer 21 is formed.

Then, supplying electricity to the induction heating coil 30 causes the fiber reinforced plastics layer 21 to be heated by induction. Further, during this induction heating, electricity is supplied to the heater 32, and the mouthpieces 10 are heated by the heating shaft 31. Note that the temperature of the mouthpieces 10 may be measured with a temperature sensor, and the heating shaft 31 may be caused to produce heat based on that temperature to heat the mouthpieces 10 to an appropriate temperature.

According to the present embodiment, since the mouthpieces 10 are heated by the heating shaft 31, which is distinct from induction heating, while the fiber reinforced plastics layer 21 is thermally cured through induction heating, heat loss from the fiber reinforced plastics layer 21 to the mouthpieces 10 can be suppressed. Therefore, the fiber reinforced plastics layer 21 can be heated efficiently. Furthermore, since portions of the fiber reinforced plastics layer 21 that are in contact with the respective mouthpieces 10 can be heated similarly to other portions, the fiber reinforced plastics layer 21 can be heated uniformly and be cured.

Furthermore, in the present embodiment, the mouthpieces 10 are made of aluminum, and the liner 20 is made of resin. Aluminum has a small dielectric constant, and thus, in this case, the mouthpieces 10 are not heated by induction. Meanwhile, the liner 20, which is made of resin, is heated by induction. Therefore, it is speculated that a large temperature difference is generated between a portion of the fiber reinforced plastics layer 21 around the mouthpiece 10 and a portion of the fiber reinforced plastics layer 21 around the liner 20 and thus delamination occurs in the fiber reinforced plastics layer 21. According to the present embodiment, since the mouthpieces 10 are heated by a separate heating unit, a temperature difference between a portion of the fiber reinforced plastics layer 21 around the mouthpiece 10 and a portion of the fiber reinforced plastics layer 21 around the liner 20 is reduced, and delamination in the fiber reinforced plastics layer 21 can be suppressed.

Figure 4:
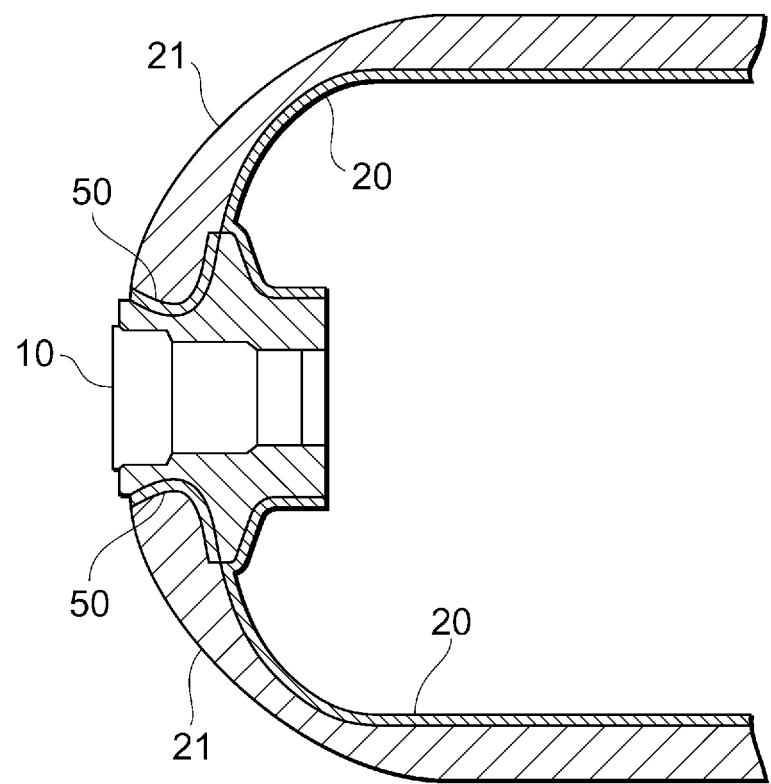
FIG. 4 is an enlarged longitudinal sectional view of a gas tank in which a heating layer is formed between a mouthpiece and a fiber reinforced plastics layer.

Although the mouthpieces 10 are heated by the heating shaft 31 while the fiber reinforced plastics layer 21 is heated through induction heating in the embodiment described above, a layer formed of a material having a dielectric constant that is larger than that of the mouthpieces 10 may additionally be formed between the mouthpiece 10 and the fiber reinforced plastics layer 21. In such a case, as illustrated in FIG. 4, for example, a heating layer 50 that is formed, for example, by an iron sheet having a large dielectric constant is formed at a portion of the mouthpiece 10 that comes into contact with the fiber reinforced plastics layer 21. The heating layer 50 may, for example, have a thickness of 0.1 mm to 0.5 mm. In such a case, the heating layer 50 is heated through induction heating, and thus heat loss from the fiber reinforced plastics layer 21 to the mouthpiece 10 can be suppressed. In addition, heat can be actively supplied to the fiber reinforced plastics layer 21, which makes it possible to heat the fiber reinforced plastics layer 21 more efficiently. Note that the material of the heating layer 50 is not limited to iron, and another material such as copper, gold, and silver may be used instead as long as such a material has a dielectric constant that is larger than that of the mouthpiece 10. Furthermore, a material having a dielectric constant of 300 W/mK or greater is preferable.

Figure 5:
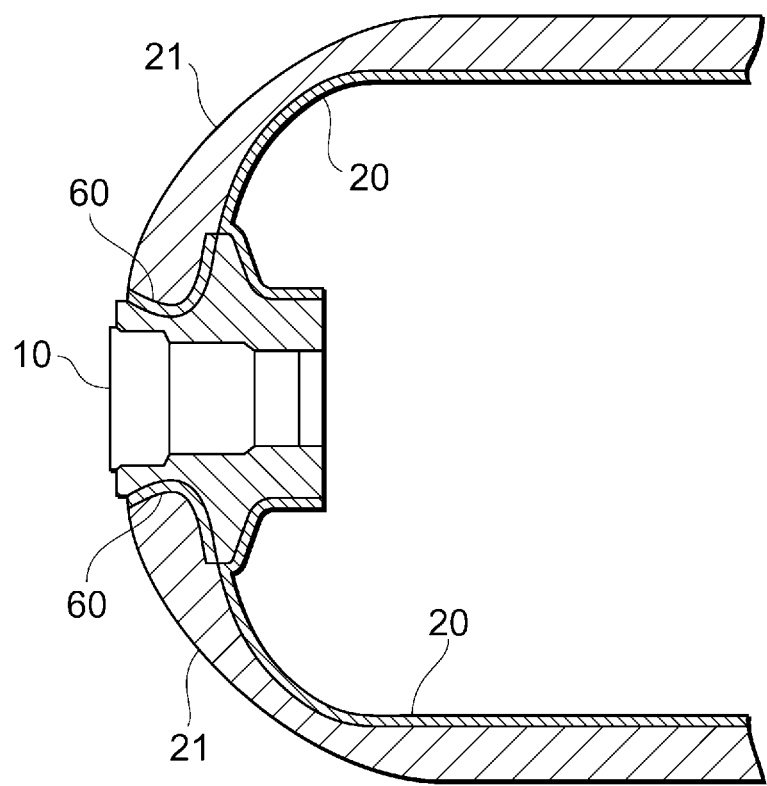
FIG. 5 is an enlarged longitudinal sectional view of a gas tank in which a heat insulating layer is formed between a mouthpiece and a fiber reinforced plastics layer.

Furthermore, in place of the heating layer 50 of the embodiment described above, a heat insulating layer may be formed between the mouthpiece 10 and the fiber reinforced plastics layer 21. In such a case, as illustrated in FIG. 5, for example, a heat insulating layer 60 that is formed, for example, by a urethane sheet is formed at a portion of the mouthpiece 10 that comes into contact with the fiber reinforced plastics layer 21. The heat insulating layer 60 can suppress heat loss from the fiber reinforced plastics layer 21 to the mouthpiece 10, and thus the fiber reinforced plastics layer 21 can be heated uniformly and efficiently. Note that the material of the heat insulating layer 60 may be another material.

Thus far, preferred embodiments of the present invention have been described with reference to the appended drawings, but the present invention is not limited to the above examples. It is apparent that a person skilled in the art can arrive at various modified examples or revised examples within the spirit of the appended claims, and it is appreciated that those modified examples and revised examples are included within the technical scope of the present invention.

For example, the heating unit that heats the mouthpieces 10 is the heating shaft 31 in the embodiment described above but may be a heating unit having another configuration.

Note that although the mouthpieces 10 are heated by the heating unit while the fiber reinforced plastics layer 21 is thermally cured in the embodiment described above, instead of heating the mouthpieces 10, the heating layer 50 or the heat insulating layer 60 may merely be provided between each mouthpiece 10 and the fiber reinforced plastics layer 21. In other words, a method of manufacturing a gas tank serving as a reference example may include a step of thermally curing a fiber reinforced plastics layer through induction heating in a state in which a layer that is formed of a material that has a dielectric constant larger than that of a mouthpiece is provided between the mouthpiece and the fiber reinforced plastics layer or a step of thermally curing a fiber reinforced plastics layer through induction heating in a state in which a heat insulating layer is provided between a mouthpiece and the fiber reinforced plastics layer. Furthermore, a gas tank serving as a reference example may include a heating layer or a heat insulating layer that is formed of a material having a dielectric constant larger than that of a mouthpiece provided at at least part of the mouthpiece (a portion that comes into contact with a fiber reinforced plastics layer). Even with these reference examples, heat loss from the fiber reinforced plastics layer to the mouthpiece during induction heating can be suppressed, and thus the fiber reinforced plastics layer can be heated and cured uniformly and efficiently.

1 fuel cell vehicle
2 gas tank
10 mouthpiece
20 liner
21 fiber reinforced plastics layer
30 induction heating coil
31 heating shaft
32 heater
50 heating layer
60 heat insulating layer

I claim:

1. A method of manufacturing a gas tank, the method comprising:
    a step of forming a fiber reinforced plastics layer by winding a fiber that is impregnated with thermosetting plastics around at least part of a mouthpiece and around a liner; and
    a step of thermally curing the fiber reinforced plastics layer through induction heating,
    wherein the mouthpiece is heated by a heating generator that is attached to the mouthpiece while the fiber reinforced plastics layer is thermally cured.

2. The method of manufacturing the gas tank according to claim 1, wherein a layer that is formed of a material having a dielectric constant that is larger than that of the mouthpiece is provided between the mouthpiece and the fiber reinforced plastics layer.

3. The method of manufacturing the gas tank according to claim 1, wherein a heat insulating layer is provided between the mouthpiece and the fiber reinforced plastics layer.

4. The method of manufacturing the gas tank according to any one of claim 1, wherein the mouthpiece is made of aluminum, and the liner is made of resin.

* * * * *